(12) United States Patent
Vesperman et al.

(10) Patent No.: US 12,112,546 B2
(45) Date of Patent: Oct. 8, 2024

(54) VISION GUIDANCE SYSTEM USING DYNAMIC EDGE DETECTION

(71) Applicant: Deere & Company, Moline, IL (US)

(72) Inventors: Aaron G. Vesperman, Ankeny, IA (US); Jeffery J. Adams, Ankeny, IA (US); Anthony J. Mainelli, Grimes, IA (US)

(73) Assignee: DEERE & COMPANY, Moline, IL (US)

( * ) Notice: Subject to any disclaimer, the term of this patent is extended or adjusted under 35 U.S.C. 154(b) by 565 days.

(21) Appl. No.: 17/245,522

(22) Filed: Apr. 30, 2021

(65) Prior Publication Data

US 2022/0350991 A1    Nov. 3, 2022

(51) Int. Cl.
  *G06V 20/56*    (2022.01)
  *A01B 69/04*    (2006.01)
  (Continued)

(52) U.S. Cl.
  CPC ............ *G06V 20/56* (2022.01); *A01B 69/008* (2013.01); *B62D 15/025* (2013.01);
  (Continued)

(58) Field of Classification Search
  CPC .. A01B 69/008; A01B 69/001; B62D 69/008; G05D 1/0038; G05D 2201/0201;
  (Continued)

(56) References Cited

U.S. PATENT DOCUMENTS 9,446,791 B2    9/2016  Nelson, Jr. et al.
9,817,396 B1 *  11/2017  Takayama ............ G05D 1/0038
(Continued)

FOREIGN PATENT DOCUMENTS

DE    102019204245 A1    10/2020
DE    102021203109 A1    11/2021
(Continued)

OTHER PUBLICATIONS

Extended European Search Report and Written Opinion issued in European Patent Application No. 22167320.5, dated Oct. 10, 2022, in 11 pages.
(Continued)

*Primary Examiner* — James M McPherson
*Assistant Examiner* — Paulo Roberto Gonzalez Leite
(74) *Attorney, Agent, or Firm* — Fenwick & West LLP

(57) ABSTRACT

A row vision system modifies automated operation of a vehicle based on edges detected between surfaces in the environment in which the vehicle travels. The vehicle may be a farming vehicle (e.g., a tractor) that operates using automated steering to perform farming operations that track an edge formed by a row of field work completed next to the unworked field area. A row vision system may access images of the field ahead of the tractor and apply models that identify surface types and detect edges between the identified surfaces (e.g., between worked and unworked ground). Using the detected edges, the system determines navigation instructions that modify the automated steering (e.g., direction) to minimize the error between current and desired headings of the vehicle, enabling the tractor to track the row of crops, edge of field, or edge of field work completed.

21 Claims, 8 Drawing Sheets

(51) Int. Cl.
| | |
|---|---|
| *B62D 15/02* | (2006.01) |
| *G05D 1/00* | (2024.01) |
| *G06T 7/40* | (2017.01) |
| *G06V 10/22* | (2022.01) |
| *G06V 10/44* | (2022.01) |
| *G06V 20/10* | (2022.01) |

(52) U.S. Cl.
CPC ............ *G05D 1/0038* (2013.01); *G06T 7/40* (2013.01); *G06V 10/225* (2022.01); *G06V 10/44* (2022.01); *G06V 20/188* (2022.01); *G06T 2207/30252* (2013.01)

(58) Field of Classification Search
CPC . G06T 7/40; G06T 2207/30252; G06V 20/56; G06V 10/225; G06V 10/44; G06V 20/188
See application file for complete search history.

(56) References Cited

U.S. PATENT DOCUMENTS

| | | |
|---|---|---|
| 2017/0248946 A1 | 8/2017 | Ogura et al. |
| 2019/0228224 A1* | 7/2019 | Guo .................... G06V 10/454 |
| 2019/0266418 A1* | 8/2019 | Xu ....................... G06V 10/764 |
| 2020/0341461 A1 | 10/2020 | Yokoyama |
| 2021/0000006 A1* | 1/2021 | Ellaboudy .............. G06V 20/56 |

FOREIGN PATENT DOCUMENTS

| | | |
|---|---|---|
| EP | 3970466 A1 | 3/2022 |
| JP | 2021016377 A | 2/2021 |
| WO | WO2020182564 A1 | 9/2020 |

OTHER PUBLICATIONS

Deere & Company, "Auto Trac™ RowSense™—Sprayer," Date Unknown, three pages, [Online] [Retrieved on May 3, 2021] Retrieved from the Internet <URL: https://www.deere.com/en/technology-products/precision-ag-technology/guidance/auto-trac-row-sense-sprayer/?panel=harvest>.

Deere & Company, "Auto Trac™," Date Unknown, three pages, [Online] [Retrieved on May 3, 2021] Retrieved from the Internet <URL: https://www.deere.com/en/technology-products/precision-ag-technology/guidance/auto-trac-vision/>.

Google AI Blog, "Real-Time 3D Object Detection on Mobile Devices with MediaPipe," Mar. 11, 2020, six pages, [Online] [Retrieved on Apr. 26, 2021] Retrieved from the Internet <URL: https://ai.googleblog.com/2020/03/real-time-3d-object-detection-on-mobile.html>.

OpenCV, "OpenCV demonstrator (GUI)," Dec. 16, 2015, seven pages, [Online] [Retrieved on Apr. 30, 2021] Retrieved from the Internet <URL: https://opencv.org/opencv-demonstrator-gui/>.

Riba, E., "Real Time pose estimation of a textured object," Date Unknown, 11 pages, [Online] [Retrieved on Apr. 26, 2021] Retrieved from the Internet <URL: https://docs.opencv.org/master/dc/d2c/tutorial_real_time_pose.html>.

Sovrasov, V., "Interactive camera calibration application," Date Unknown, five pages, [Online] [Retrieved on Apr. 26, 2021] Retrieved from the Internet <URL: https://docs.opencv.org/master/d7/d21/tutorial_interactive_calibration.html>.

* cited by examiner

VISION GUIDANCE SYSTEM USING DYNAMIC EDGE DETECTION

This disclosure relates generally to a detection system for vehicles, and more specifically to detecting an edge between surfaces to control the operation (e.g., automated steering) of a farming vehicle.

BACKGROUND

Automated operation of vehicles may depend on information that is not always reliably provided to the vehicles. For example, automated navigation often depends on Global Positioning System (GPS) information that is wirelessly provided to an autonomous or semi-autonomous vehicle. The communication channel providing information for automated operation, however, is subject to influence by factors inherent to the medium, such as fading or shadowing, or external factors, such as interference from transmitters on or near the same radio frequencies used by the communication channel.

Additionally, automated operation of a vehicle is dependent upon the accuracy with which the environment around the vehicle is understood (e.g., by a computer vision system managing the automated operation). For example, navigation of the vehicle is improved as the accuracy with which objects or boundaries surrounding the vehicle, affecting where the vehicle can or should travel, is improved. Systems in the art may depend fully on computer-determined classification of objects or boundaries in the environment, neglecting the increase in accuracy afforded by external input such as manually identified objects or boundaries.

Automated operation may further require tremendous processing and power resources, which may be limited in certain devices such as on-vehicle embedded controllers. This limitation may cause delays in the automated operation. While there is increasing incentive to leverage mobile devices for automated operation due to their commercial prevalence and convenience, mobile devices may similarly, despite a potential improvement over the limitations of an embedded controller, cause delays in the automated operation due to their processing and power constraints. These delays may render the automated operation insufficient or even detrimental to its operator.

SUMMARY

A system for detecting edges between surfaces in an environment is described herein. An edge, or "row edge," between two surfaces may be detected by a row vision system to modify the operation of a vehicle (e.g., steering direction or speed). The row vision system may be used in a farming environment where various operations depend on the identification of an edge between surfaces such as soil and crops. For example, a tractor may perform mowing using the row vision system that detects an edge between previously cut crop and uncut crop. The row vision system may provide an operator images of the field ahead of the tractor, enabling the operator to identify a location within the images where there is a target edge of a field crop that the tractor should follow. Using the operator's input, the row vision system may identify a set of candidate edges that are likely to include the target edge. In particular, the row vision system may limit the identification of candidate edges to an area of the images around the operator-provided location. The row vision system may use a model (e.g., a machine learning model) to select an edge of the candidate edges and modifies the route of the tractor based on the selected edge.

Accordingly, the row vision system may be reliant upon information such as images taken from a camera located at the vehicle, where this information is more reliably available than information subject to wireless communication conditions (e.g., GPS signals). By using operator input to supplement the operation of the computer vision classification of the environment, the row vision system may increase the accuracy of the classification (e.g., more accurately identifying an edge between surfaces). The row vision system improves the operation of devices with limited processing or power resources (e.g., mobile devices) by decreasing the amount of processing required by the mobile devices. For example, by limiting the identification of candidate edges to a particular area within the images captured by the vehicle's camera, the row vision system avoids performing unnecessary image processing on portions of the images that are unlikely to include the target edge indicated by an operator.

In one embodiment, a row vision system accesses a set of images captured by a vehicle while navigating via automated steering through an area of different surface types. The set of images may include images of a ground surface in front of the vehicle. The images may be displayed to an operator that is collocated with the vehicle or located remotely. The row vision system receives an input from the operator, where the input represents a location within the set of images (e.g., where a target edge is between two surface types). The system identifies a set of candidate edges within an image portion corresponding to the location within the images. For example, the image portion may be a region or bounding box centered at the location. Each candidate edge identified may correspond to a candidate boundary between two different surface types. For example, one candidate edge may be a boundary between uncut crop and cut crop in front of the mowing tractor. The row vision system applies an edge selection model to the set of candidate edges. The edge selection model may be configured to select an edge of the set of candidate edges based on the location within the set of images represented by the received input. For example, the edge selection model may include a machine learning model trained to identify whether the candidate edge identified within the image is an actual edge between two different surface types and a confidence score representing the accuracy level of the identification. The row vision system modifies a route being navigated by the vehicle based on the selected candidate edge. For example, the steering wheel direction is changed to guide the vehicle towards the row of uncut crop for mowing to maintain a lateral offset distance as needed for the mowing implement.

The set of candidate edges may be identified using an edge detection model corresponding to one or both of the two different surface types adjacent to a candidate edge. For example, the edge detection model may be a machine-learned model trained on images of manually tagged boundaries between two surface types such as soil and one of a crop, grass, and pavement. The edge selection model configured to select an edge of the set of candidate edges may be configured to weight the candidate edges at least in part based on a distance between each candidate and the user-input location within the set of images. A first candidate edge may be weighted lower than a second candidate edge that is closer to the location represented by the user-input location. The edge selection model may include a machine-learned model that is trained on images each with a set of candidate edges and a manually-selected edge of the set of candidate edges.

The vehicle may identify each of the two different surface types between which a candidate edge is located. The vehicle may select an edge selection model from a set of edge selection model based on the identified surface types. The identified surface may include a type of crop, where images of the type of crop may be used to train the edge selection model. The vehicle may identify the set of candidate edges, apply the edge selection model, or perform a combination thereof. Alternatively or additionally, a remote computing system communicatively coupled to the vehicle may identify the set of candidate edges, apply the edge selection model, or perform a combination thereof. To modify the route being navigated by the vehicle, the row vision system may move the vehicle such that an edge of a tool or instrument being pulled by the vehicle is aligned with the selected edge. Additionally sets of candidate edges may be iteratively identified as the vehicle captures additional images. The edges may be iteratively selected from among the sets of candidate edges.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
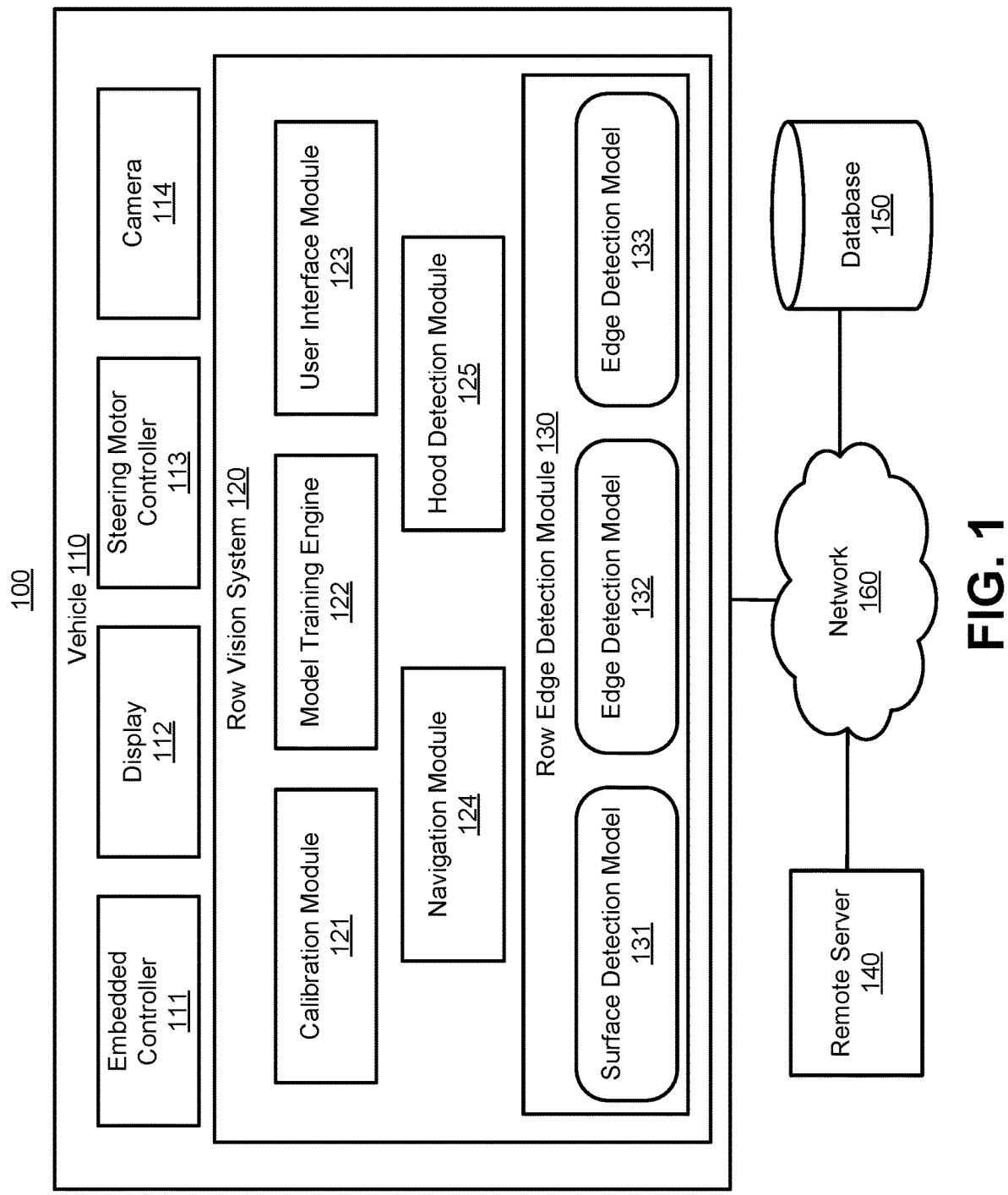
FIG. 1 is a block diagram of a system environment in which a vehicle operates, in accordance with at least one embodiment.

FIG. 1 is a block diagram of a system environment 100 in which a vehicle 110 operates, in accordance with at least one embodiment. The system environment 100 includes a vehicle 110, a remote server 140, a database 150, and a network 160. The system environment 100 may have alternative configurations than shown in FIG. 1, including for example different, fewer, or additional components. For example, the system environment 100 may include not include the network 160 when the vehicle 110 operates offline.

The vehicle 110 includes hardware and software modules configured to enable the vehicle 110 to perform tasks autonomously or semi-autonomously. The vehicle 110 may be a farming vehicle such as a tractor, or any vehicle suitable for performing farming operations along an edge between two types of surfaces or an edge between variations within one surface. Farming operations may include mowing, harvesting, spraying, tilling, etc. An example of a variation within one surface includes a soil surface with a type of crop planted and without crops planted. The vehicle may be a land-based or aerial vehicle (e.g., a drone). The vehicle 110 includes hardware such as an embedded controller 111, a display 112, a steering motor controller 113, and a camera 114. The vehicle 110 includes software such as a row vision system 120. As referred to herein, a "row" may be a portion of a surface adjacent to another surface or a variation within the surface. For example, a first row may be a row of soil without crops planted that is adjacent to a second row of soil with crops planted.

The vehicle 110 may have alternative configurations than shown in FIG. 1, including for example different, fewer, or additional components. For example, the vehicle 110 may include a user device such as a tablet or smartphone including the display 112 and the camera 114 and configured to execute the row vision system 120 software. The vehicle 110 may include a mount for the user device to be installed or removed from the vehicle 110 when the vehicle 110 is not in operation. In another example, the vehicle 110 may not include the display 112, which may instead be located remotely for remote control of an automated farming vehicle. Although not depicted, the vehicle 110 may include radio frequency (RF) hardware to enable the vehicle 110 to communicatively couple to the network 160. The RF hardware may be included within the user device. Although the embedded controller 111, the display 112, the steering motor controller 113, and the camera 114 are shown as component separate from the row vision system 120, one or more of these components may be included within the row vision system 120.

The embedded controller 111 enables communication between a processing device executing the row vision system 120 and the steering motor controller 113. The embedded controller 111 may enable this communication using a Controller Area Network (CAN) bus, optical transceivers (connected from display) or digital pulse width modulation (PWM) electrical signals. The embedded controller 111 may receive data generated by the row vision system 120 and generate corresponding instructions to the steering motor controller 113. For example, the row vision system 120 determines a distance between a target edge and a reference point on the vehicle (e.g., the location of a GPS receiver on the vehicle or center point of rear axle). This distance may be referred to as a "desired guidance line lateral error." Additionally, the row vision system 120 determines a distance between a detected row edge 408 and a tracking target 406. This distance may be referred to as a "target lateral error." The embedded controller 111 may receive lateral error offset values (e.g., offset values of the desired guidance line lateral error and/or the target lateral error) for modifying the navigation of the vehicle 110 as determined by the row vision system 120. The embedded controller 111 may be configured to generate, responsive to receiving the lateral error values, analog signal instructions to transmit to the steering motor controller 113, which then modifies the movement of the vehicle 110.

In addition or as an alternative to receiving lateral error values, the embedded controller 111 may receive heading error values, geographic location information (e.g., GPS information), a steering wheel speed value, or a steering wheel direction value. The heading error may be an angle made between a desired heading of the vehicle and the actual heading of the vehicle. In some embodiments, the vehicle 110 may be configured to allow the row vision system 120 to modify the vehicle's motor operation without the embedded controller 111. For example, the row vision system 120 may be integrated into a computing device that is fixed onboard the vehicle 110, where the computing device includes hardware and software functionality to implement the operations of the row vision system 120 and the steering motor controller 113.

The display 112 provides an output for a graphical user interface (GUI) for the row vision system 120 to be displayed and an input for the operator of the vehicle 110 to control the row vision system 120. Although an operator is described herein, the described edge detection may be performed using a fully autonomous vehicle (i.e., without an operator). The user interface may be any suitable interface, such as a keypad, keyboard, touch screen, touchpad, stylus input, voice recognition interface, or other interfaces for receiving user input. The display 112 may be provided as a stand-alone device or integrated with other elements of the vehicle 110. The display 112 may be a display of a mobile device (e.g., a tablet). Although not shown, a speaker and/or a microphone may be integrated with the vehicle 110 or as a component of a mobile device to further facilitate input and output for the row vision system 120.

The steering motor controller 113 regulates the steering motor of the vehicle 110 based on values (e.g., lateral error) determined by the row vision system 120. The steering motor controller 113 may include a control loop mechanism that employs feedback to automate steering of the vehicle 110. For example, the steering motor controller 113 may include a proportional-integral-derivative (PID) controller or any suitable control loop mechanism for automated steering. The steering motor controller 113 may receive instructions from the embedded controller 111, where the instructions may be in the form of analog signals used to specify a particular direction or used to increase or decrease the speed at which the vehicle 110 steers in that particular direction.

The camera 114 captures images and/or video for the row vision system 120 to perform edge detection. The images may be taken before or during operation of the vehicle. Images captured by the camera 114 before operation may be used for calibration of the camera for edge detection. Calibration is described further in the description of the calibration module 121 and FIGS. 6 and 7. Images captured by the camera 114 during operation may be used for edge detection and modifying the operation of the vehicle 110 based on the detected edges within the images. The camera 114 may be an RGB camera, 3D stereo camera, mono camera, video camera, thermal camera, light detection and ranging (LiDAR) camera, any other suitable camera for detecting edges within captured images, or a combination thereof. In some embodiments, the vehicle includes a LiDAR camera for detecting variations in surfaces (e.g., mounds within a surface) or other height differences among objects within the vehicle's environment, which may be accounted for when detecting an edge within the surface. The camera 114 may be a standalone camera, integrated within the vehicle 110, or integrated within a processing device executing the row vision system 120. The camera 114 is communicatively coupled to enable the row vision system 120 to access images captured. The camera 114 may be in a front-facing configuration such that the images capture surfaces ahead of the vehicle. While reference is made to captured images for clarity throughout the specification, the operations described with respect to images may be likewise applicable to videos captured by the camera 114.

The row vision system 120 detects edges between surfaces, which may be referred to herein as "row edges," as depicted within images (e.g., of fields). The row vision system 120 may determine instructions to change the operation of the vehicle 110. For example, the system may determine a direction and/or speed at which a steering wheel of the vehicle 110 is to be turned. The row vision system 120 includes various software modules configured to detect edges within images or videos captured by the camera 114 and modify the operation of the vehicle 110 based on the detected edges. The software modules include a calibration module 121, a model training engine 122, a user interface module 123, a navigation module 124, a hood detection module 125, and a row edge detection module 130. The row vision system 120 may have alternative configurations than shown in FIG. 1, including for example different, fewer, or additional components. For example, the row vision system 120 may not include the model training engine 122. In such an example, the training for machine learning models used in edge detection may be performed remotely rather than at the vehicle 110 to conserve processing or power resources of the vehicle 110 or a user device executing the row vision system 120.

The calibration module 121 determines a position (e.g., a 3D coordinate position) of the camera 114 relative to a reference point in the vehicle 110 and/or the position relative to a reference point on the ground to the camera 114. This determined position relative to the point in the vehicle 110 may be referred to as a "camera-3D pose estimation to vehicle." The determined position relative to the point on the ground may be referred to as a "camera 3D pose estimate to ground plane." A "camera lateral offset" may be defined as the shortest distance from the camera 114 to a line running from the front center to the rear center of the vehicle 110. The line may be the center of the vehicle or any line used for calibration. For example, a line may be applied (e.g., painted) to the hood of the vehicle 110 for calibration and/or hood detection. The hood may be selected as a marker for continuous calibration when determining ground truth camera 3D pose, as vehicles (e.g., tractors) may have a fixed axel on the chassis frame and the hood may move with the main, solid, rear axle even if isolators of a cab of the vehicle result in camera movement. The calibration module 121 may perform calibration to check environmental factors that contribute to edge detection performed by the row vision system 120. The environmental factors may include lighting states (e.g., off and in field), engine states (e.g., off and running), camera 3D pose (e.g., including camera lateral offset and camera pitch), and vibration allowances.

In some embodiments, the calibration module 121 may begin a calibration process by receiving confirmation that the vehicle 110 is in a proper state or location for calibration. For example, an operator may manually steer the vehicle to a predetermined location and provide user input (e.g., via the display 112) that the vehicle 110 is properly located and/or to begin calibration. The calibration module 121 receives images from the camera 114 depicting calibration markers in predetermined calibration configurations. Calibration markers may include tape, painted shapes, mats, or any suitable object for marking one or more points and/or predetermined distances between the marked points. Calibration configurations are depicted in FIGS. 6 and 7.

The calibration module 121 may receive user-specified expected distances between calibration markers within images of calibration configurations. For example, the calibration module 121 may access user-provided images of calibration configurations corresponding to respective camera 3D pose. The calibration module 121 may determine locations of calibration markers within images received from the camera 114 and compare the determined locations to expected locations from the user-provided images. Based on the comparison, the calibration module 121 may determine the camera 3D pose and recommend camera mounting adjustments required by the navigation module 124 for proper operation. In some embodiments, the calibration module 121 may continuously process received images corresponding to a discrete range of camera 3D poses and apply interpolation to the image processing to determine a camera 3D pose estimate to the ground plane while estimating change in ground objects to determine a candidate edge 3D position. The calibration module 121 may use the vehicle 110 as a calibration marker to continuously estimate camera 3D pose changes that may result in world coordinate systems (e.g., ground plane) offsets. The calibration module 121 may provide the determined camera 3D pose for display at the display 112 via the user interface module 123.

In some embodiments, the calibration module 121 may determine instructions to adjust the camera 3D pose to an expected position. For example, a target camera pitch of twenty degrees may be used for capturing an appropriate portion of the hood of the vehicle 110 in images for edge detection. The calibration module 121 may determine a difference between a current camera pitch and the target camera pitch of twenty degrees. The calibration module 121 may generate a notification provided at the display 112 that includes the determined difference and instructions to move the camera 114 a particular direction to minimize the difference. In some embodiments, the row vision system 120 may provide instructions to a controller that may automatically adjust the positioning of the camera 114. For example, the camera 114 may be part of a tablet installed within a motorized mount on the vehicle 110, the motorized mount communicatively coupled to the row vision system 120 via a controller. The determined camera pitch difference determined by the calibration module 121 may be provided to the controller to operate the motorized mount and adjust the camera's position in the vehicle 110. The motorized mount may also allow for improved calibration module 121 processing of inertial measurement unit (IMU) and camera data to determine camera 3D pose estimation to vehicle while the vehicle 110 is not moving.

The model training engine 122 trains machine learning models for use in detecting edges (e.g., during farming operations). Detected edges include edges between surfaces, between variations within a surface, or the edge of a hood of the vehicle. The model training engine 122 may train one or more of the machine learning models of the row edge detection module 130: the surface detection model 131 and the edge detection models 132 and 133. The model training engine 122 may use images depicting one or more surfaces or variations within a surface to train the models. For example, the model training engine 122 may use an image depicting a roadside and a farming field to train the models.

The images may be labeled with one or more surface types or crop types as depicted in the image and/or the presence of an edge. The labeling may be manually labeled or determined automatically by the model training engine 122 (e.g., using computer vision). Surfaces may include a ground surface (e.g., the surface on which the vehicle travels on or over), surfaces of objects such as the surface of the hood of the vehicle 110. Ground surfaces may have various types such as "roadside" and "field," may be characterized by objects on the surface such as whether crops are present, and/or characterized by the state of the surface (e.g., dry or wet). In the previous example, the image depicting the roadside and the farming field may be labeled with labels for the corresponding surface types of "roadside" and "field." The image may be further or alternatively labeled to indicate an edge is present in the image. This label may be associated with the surface types that the edge separates. The model training engine 122 may access the images used for training from the database 150.

The model training engine 122 may train a machine learning model of the row edge detection module 130 using images each with a set of candidate edges and a manually-selected edge of the set of candidate edges. In some embodiments, the row vision system 120 determines a set of candidate edges within an image and provides the image with the candidate edges to a user for manual selection of a target edge. The determination of the set of candidate edges is described further with respect to the row edge detection module 130. The row vision system 120 may receive the user's selection of the target edge and use the image with the set of candidate edges and the manually selected edge to train a model (e.g., the edge detection models 132 or 133).

In some embodiments, the model training engine 122 may train a machine learning model based on a type of crop depicted within a surface identified within images captured by the camera 114. The model training engine 122 may access images depicting one or more crops. The images may be manually labeled with a type of crop or the model training engine 122 may determine crop types with which to label respective images. The model training engine 122 uses the labeled images to train a model. For example, the model training engine 122 uses images depicting soil without a crop and soil with lettuce planted, where the image may be labeled with a surface type of "field" and a crop type of "lettuce."

In some embodiments, the model training engine 122 trains a machine learning model in multiple stages. In a first stage, the model training engine 122 may use a first set of image data collected across various farming environments (e.g., surface or crop types as depicted from various farms) to train the machine learning model. This generalized data may be labeled (e.g., by the model training engine 122) with the corresponding surface type, crop type, or edge presence. In a second stage of training, the model training engine 122 may use data collected by the camera 114 to optimize the models trained in the first stage to the environmental conditions associated with the vehicle 110. The model training engine 122 may re-train a machine learning model using the second training set such that the machine learning model is customized to the vehicle 110 or the environment in which the vehicle 110 operates.

In addition or alternatively, the model training engine 122 may use user feedback to train the models in the second stage. For example, the user interface module 123 receives feedback provided by the operator of the vehicle 110 using the display 112 that a machine learning model correctly or incorrectly identified an edge within the image captured by the camera 114. In some embodiments, the first training set used to train that model may also be included in the second training set to further strengthen a relationship or association between data and identified objects during the second stage of training. For example, if the received feedback indicated that the machine learning model correctly identified the edge, the first training set may be included within the second training set.

In some embodiments, the model training engine 122 uses metadata related to the feedback to re-train a machine learning model. For example, the model training engine 122 may determine the frequency at which a user provides a user input instructing the row vision system 120 to detect an edge, and use the determined frequency to re-train the machine learning model. The model training engine 122 may use a threshold feedback frequency to determine a likelihood that the detected edge is accurate. That is, if an operator is frequently requesting an edge to be detected (e.g., over five times in under a minute), the edge detected by the row edge detection module 130 is likely inaccurate and the model training engine 122 may adjust the training data such that data associated with the inaccurate edge detected is given less weight or is not used in the future.

Figure 4:
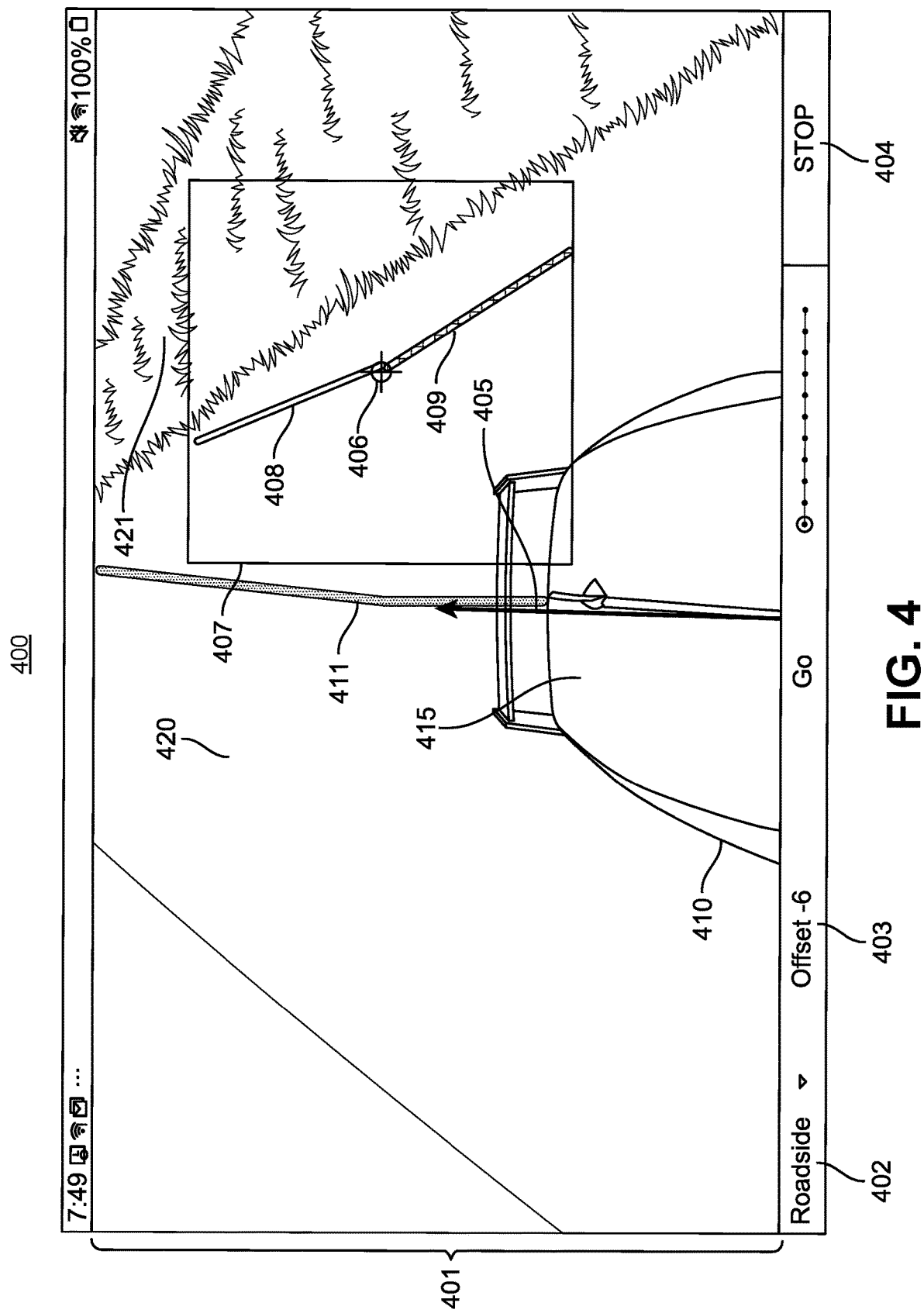
FIG. 4 depicts a graphical user interface (GUI) for edge detection, in accordance with at least one embodiment.
Figure 5:
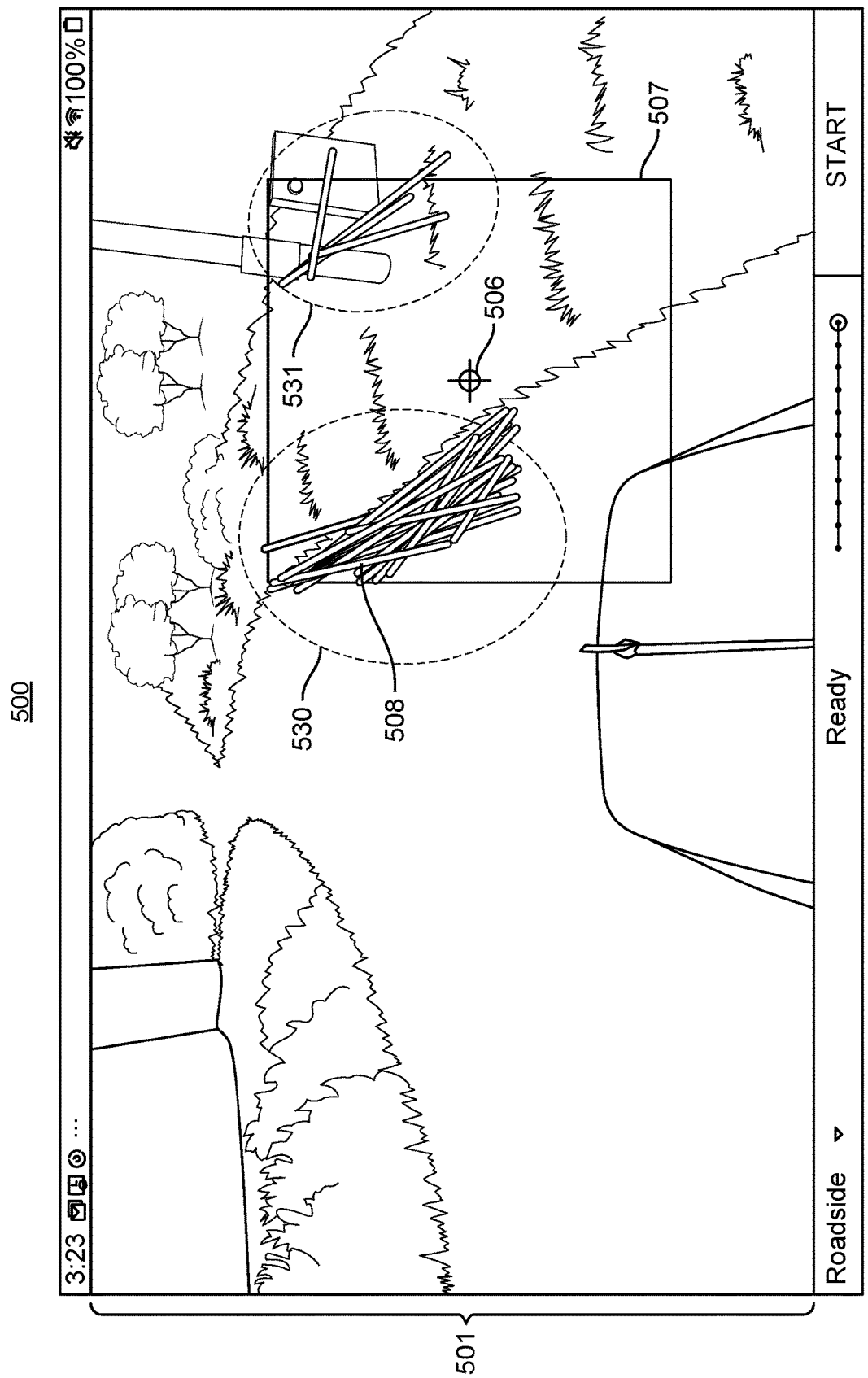
FIG. 5 depicts edge candidates provided within a GUI for edge detection, in accordance with at least one embodiment.

The user interface module 123 enables user input and system output for modifying the operation of the vehicle 110 using the row vision system 120. In some embodiments, the user interface module 123 provides a GUI for display at the display 112. Examples of GUIs that the user interface module 123 can provide are depicted in FIGS. 4 and 5. The user interface module 123 may provide images or videos of the view ahead of the vehicle 110 during operation and receive a user input representative of a location within the images as displayed to an operator of the vehicle 110. In some embodiments, the user interface module 123 may provide an operation status of the vehicle 110 at the display 112. For example, a GUI may display that the vehicle is currently engaged in automated steering. The operation status may also include the current heading of the vehicle and/or the desired guidance line to which the vehicle is tracking.

The user interface module 123 may provide inputs for an operator to select a type of surface that the vehicle 110 is currently traveling over. In some embodiments, the surface may be automatically determined by the row vision system 120. For example, the user interface module 123 may receive, from the surface detection model 131, a determined surface depicted within an image captured by the camera 114 of the environment ahead of the vehicle 110. The user interface module 123 may then display the determined surface on a GUI at the display 112. Although the action of displaying is referenced with respect to the output of the user interface module 123, the user interface module 123 may provide additional or alternative input/output mechanisms such as sound (e.g., using natural language processing or predetermined utterances related to the vehicle's operations) or haptics (e.g., vibrating the steering wheel to confirm that a row edge has been identified and will cause the steering to change).

The navigation module 124 may determine information describing the position and/or orientation of the vehicle 110 and generate instructions for modifying the operation of the vehicle 110 based on the determined position and/or orientation information. This information may include a lateral and/or heading error of the vehicle 110. The navigation module 124 may provide a determined error to the embedded controller 111 to modify a route being navigated by the vehicle 110. Modifying the route may include moving the vehicle 110 such that an edge of a tool or instrument being pulled by the vehicle is aligned with an edge (e.g., between a row of crops and soil) detected by the row vision system 120.

The navigation module 124 may determine a lateral error of the vehicle 110 with respect to a desired guidance line. The navigation module 124 may receive a desired guidance line (e.g., the desired guidance line 411 as shown in FIG. 4) as specified by a user. The desired guidance line may be a path on an automated routine or a target edge (e.g., the target edge 406 in FIG. 4) that an operator specifies that the vehicle 110 (e.g., via the automated steering) should follow. The target lateral offset with respect to a target edge may be calculated based on the target edge and the hood of the vehicle 110 as depicted within images captured by the camera 114. The target lateral offset may also depend on the camera lateral offset. In one example, the navigation module 124 determines, within an image, lines formed by the target edge and a reference line associated with the hood of the vehicle 110 (e.g., painted on the hood). The navigation module 124 determines corresponding x-intercepts of the determined lines. For example, with reference to FIG. 4, the navigation module 124 may determine the corresponding x-intercept of the detected row edge 408 inside the bounding box 407 projected coordinate system with tracking target 406 as origin or center point (0,0). The navigational module 124 may calculate target lateral error using Equation 1.

$$Err_{lat} = [X_{edge_0} - X_{target}] * \left(\frac{mm}{pixel}\right) \qquad \text{Eqn (1)}$$

Where $Err_{lat}$ is the target lateral error, $X_{edge_0}$ is the x-intercept of the line formed by the target edge, $X_{target}$ is the x-intercept of the line formed by the reference line associated with a tracking target, and $$\frac{mm}{pixel}$$

is a ratio of millimeters captured by each pixel within the photo.

The navigation module 124 may determine a heading error of the vehicle 110 with respect to a desired heading. The navigation module 124 may receive a desired heading as specified by a user. The desired heading may correspond to the desired guidance line specified by a user. To determine the heading error of the vehicle 110, the navigation module 124 may calculate the angle between the desired heading and the current heading of the vehicle 110. The navigational module 124 may calculate heading error using Equation 2.

$$Err_{Heading} = [(M_{edge_0} - M_{target})] * \left(\frac{mm}{pixel}\right) \qquad \text{Eqn (2)}$$

Where $Err_{Heading}$ is the heading error, $M_{edge_0}$ is the slope of the line formed by the target edge, $M_{target}$ is the slope of the line formed by the reference line associated with the tracking target (e.g., target tracking heading 409 of FIG. 4), and $$\frac{mm}{pixel}$$

is a ratio of millimeters captured by each pixel within the photo.

The navigation module 124 may determine a steering wheel speed based on a determined error or determined distance to obstacles or end of rows as detected with object recognition computer vision. The determined speed may be proportional to the determined error or obstacle distance. For example, the navigation module 124 may determine a first steering wheel speed corresponding to a first lateral error and a second steering wheel speed corresponding to a subsequent, second lateral error, where the second speed is smaller than the first speed because the second lateral error is smaller than the first lateral error. The navigation module 124 may access a mapping table of speeds to heading and/or lateral errors. The navigation module 124 may update the values of the mapping table based on user feedback. For example, an operator of the vehicle 110 may begin manually steering the vehicle 110 after the steering motor controller 113 has modified the direction in which the vehicle is traveling based on the speed determined by the navigation module 124. The vehicle 110 may provide an indication to the navigation module 124 that the automated steering was manually overridden, and the navigation module 124 may modify an algorithm for selecting a speed (e.g., modifying a confidence score or weight associated with the selected speed).

The navigation module 124 may determine a steering wheel direction based on a determined error. For example, the navigation module 124 determines (e.g., using Equation 1) a positive or negative offset and determines a corresponding direction (e.g., left or right) in which to direct the steering wheel.

The hood detection module 125 may detect the hood of the vehicle 110 within images captured by the camera 114. The hood detection module 125 may use an edge detection operation such as Canny edge detection, Roberts filter, Sobel filter, Prewitt filter, or any suitable digital image processing technique for detecting edges. The hood detection module 125 may calculate a current heading line of the vehicle 110 within the images using the detected hoods. The hood of the vehicle 110 may include a marker. In one example, the marker is a line painted across the center of the hood in the direction that the vehicle is facing. The hood detection module 125 may detect the marker in the images subsequent to detecting the hood. This order of detection may save processing resources by first determining if an image depicts the hood rather than detect the marker in an image that does not depict the hood. The hood detection module 125 may use the marker detected within an image to determine a line that is represents current vehicle heading within the image. This detected line may be used by the navigation module 124 for lateral and/or heading error calculations.

The row edge detection module 130 detects row edges as depicted in images (e.g., of farming fields) and provides the detected edges within images to the navigation module for modification of the operation of the vehicle 110. The row edge detection module 130 may implement models such as the surface detection model 131 and the edge detection models 132 and 133. The models may be machine learning models. Machine learning models of the row edge detection module 130 may use various machine learning techniques such as linear support vector machine (linear SVM), boosting for other algorithms (e.g., AdaBoost), neural networks, logistic regression, naïve Bayes, memory-based learning, random forests, bagged trees, decision trees, boosted trees, boosted stumps, or any suitable supervised or unsupervised learning algorithm.

The row edge detection module 130 may implement additional, fewer, or different models than depicted in FIG. 1. For example, the row edge detection model 130 may be specialized to detect edges between soil and one particular type of crop, which may render the use of more than one edge detection model as unnecessary. In this example, the operator may intend the vehicle 110 to be limited to following edges between soil and lettuce; thus, one edge detection model corresponding to an edge between surface type "field" and crop type "lettuce" may be implemented by the row edge detection module 130.

The row edge detection module 130 may access a set of images captured by the vehicle 110 while the vehicle is navigating via automated steering through an area of different surface types. The set of images may include images of a ground surface in front of the vehicle 110. In some embodiments, the camera 114 may capture the images and provide the images to the row edge detection module 130. The row edge detection module 130 may determine an edge within the set of images between the ground surface and a surface adjacent to the ground surface.

The row edge detection module 130 may identify a set of candidate edges with an image portion corresponding to the location within the set of images. Each candidate edge may correspond to a candidate boundary between two different surface types. The row edge detection module 130 may determine the image portion based on user input provided through the user interface module 123. For example, a user may select a point on an image (e.g., displayed on the display 112) including the ground surface, where the point is part of a line for the target edge. The row edge detection module 130 may determine a bounding box (e.g., having dimension of pixels) centered on the user-selected point within the image. The row edge detection module 130 may then perform edge detection on the image portion within the bounding box rather than the original image. This may conserve processing and/or power resources of the computing device executing the row vision system 120.

To identify the set of candidate edges within the image portion, the row edge detection module 130 may use an edge or line detection operation such as Canny edge detection or a Hough Transform. In some embodiments, a combination of operations (e.g., Canny edge detection followed by a Hough Transform) may increase the accuracy of the edge detection. From the identified set of candidate edges, the row edge detection module 130 may select a candidate edge that most accurately aligns with the edge between surfaces as depicted in an image captured by the camera 114. This selected candidate edge may be referred to herein as a "best fit edge."

In some embodiments, the set of candidate edges may be identified using an edge detection model corresponding to one or more surface types (e.g., soil and crop). The edge detection model may be used in combination with an edge detection operator. For example, the row edge detection module 130 may apply a Hough Transform followed by the edge detection model to the image portion centered at the operator-selected location within an image. The edge detection model applied may depend on the types of surfaces depicted within the image portion, which may be identified by a surface detection model described herein. The result of the application may be a set of candidate edges, where each edge may have a likelihood of being a best fit edge above a predetermined threshold (e.g., a confidence score of at least 80 out of 100). The row edge detection module 130 may apply one or more additional models to the resulting candidate edges to determine the best fit edge. Such models may include a machine-learned model, statistical algorithms (e.g., linear regression), or some combination thereof.

The row edge detection module 130 may include, although not depicted, an edge selection model to select the best fit edge within the image portion. While the operations for selecting a best fit edge may be described herein with reference to the models depicted in FIG. 1, an edge selection model may perform similar operations. The edge selection model may include one or more of the models depicted. For example, the edge selection model may include the surface detection model 131 and one of the edge detection models 132 or 133. The vehicle 110 or a mobile device coupled to the vehicle 110 may identify the set of candidate edges and apply the edge selection model. The row vision system 120 may include a set of edge selection models. Each of the edge selection models may be configured for a respective pair of surface types to select an edge among candidate edges (i.e., between the respective pair of surface types).

The surface detection model 131 detects surfaces present in images. Surface types include soil without crops, soil with crops, grass, pavement, sand, gravel, or any suitable material covering an area. The surface types may be further characterized by states of the surface such as dry, wet, flat, sloped, etc. The surface detection model 131 may receive, as input, image data corresponding to an image depicting at least one surface and identify one or more surface types within the image. The surface detection model 131 may be trained by the model training engine 122 using images of surfaces that are labeled with the corresponding surface. The surface detection model 131 may be re-trained by the model training engine 122 using user feedback indicating the identification of a surface was correct or incorrect and/or additional labeled images of surfaces (e.g., of the farming environment in which vehicle 110 operates). The row edge detection module 130 may use the surfaces identified by the surface detection model 131 within an image to select an edge detection model. For example, the surface detection model 131 determines that soil and pavement type surfaces are present in an image and the row edge detection module 130 selects an edge detection model trained to identify edges between soil and pavement type surfaces. The selected edge detection model may then determine a best fit edge within the image.

An edge detection model (e.g., edge detection models 132 and 133) identifies an edge within an image. In particular, the identified edge may be a best fit edge among a set of candidate edges. The row edge detection module 130 may apply one or more images and candidate edges associated with the images (e.g., the images may be annotated with candidate edges as shown in FIG. 5) to an edge detection model. The edge detection model may determine confidence scores associated with respective identified edges. In some embodiments, an edge detection model may be trained by the model training engine 122 on images of manually tagged boundaries between two surfaces. For example, the training images may be manually tagged with boundaries between soil and one of a crop, grass, and pavement. The boundaries may further be tagged with an indication of best fit or lack of best fit (e.g., positive and negative sample training).

In one example, the row edge detection module 130 applies a set of images and candidate edges to the edge detection model 132 to determine a best fit edge among the candidate edges between surface types of soil and pavement. The edge detection model 132 may be trained by the model training engine 122 using training images depicting edges between soil and pavement. The edges depicted within the training images may be labeled to indicate that the edge is the best fit edge or is not the best fit edge. The edge detection model 132 can determine, for each image applied by the row edge detection module 130 depicting an edge of the candidate edges, that the image depicts a best fit edge or does not depict a best fit edge. In this example, the edge detection model 133 may be configured to identify best fit edges between two different types of surfaces than soil and pavement (e.g., crops and soil, crops and pavement, a first type of crop and a second type of crop, etc.).

The row edge detection module 130 may determine confidence scores for one or more of the candidate edges using one or more models. The surface detection model 131 may determine a confidence score for the identified surface types. In some embodiments, confidence scores associated with the identified surfaces may be used to determine which edge detection model to apply to an image or image portion with candidate edges. For example, the surface detection model 131 may determine two surfaces depicted in an image portion are soil and pavement with 40% confidence and soil and a crop with 90% confidence. The row edge detection module 130 may use the determined confidence scores to select an edge detection model for detecting edges between soil and a crop. In some embodiments, the row edge detection module 130 may use one or more of the confidence scores determined by the surface detection model and edge detection model to determine a confidence score for a candidate edge. For example, the confidence score determined by the surface detection model 131 is 90% for a pair of surface types and the confidence score determined by the edge detection model 132 is 95%. The confidence score for the candidate edge may be a combination of the two (e.g., a weighted average of the two based where the weights correspond to the accuracy of the respective models).

In addition or as an alternative to the application of the models depicted in FIG. 1 to identify a best fit edge in the set of candidate edges, the row edge detection module 130 may apply one or more algorithms to identify the best fit edge. A first algorithm may include determining, among the set of candidate edges, the candidate edge having the shortest distance from a user-selected point within the image. In some embodiments, the edge detection model may be configured to weight the candidate edges at least in part based on a distance between each candidate edge and a user-selected location, represented by input received (e.g., via a selection of the location at the display 112), within the set of images. With respect to the first algorithm, the largest weight may be applied to the candidate edge with the shortest distance from the user-selected location. For example, a first candidate edge is weighted lower than a second candidate edge that is closer to the user-selected location, represented by the input, than the first candidate edge. A second algorithm may include calculating the average slope of the candidate edges and selecting a candidate edge having the slope closest to the average slope. A third algorithm may include linear regression based on points within the candidate edges. A fourth algorithm may include randomly selecting an edge.

The row edge detection module 130 may provide the candidate edges to an operator (e.g., via the user interface module 123) for display at the display 112. The operator may select the best fit edge and the row edge detection module 130 may receive the user-selected best fit edge. The row edge detection module 130 may perform optional confidence score determinations associated with one or more of the candidate edges including the user-selected edge. The row edge detection module 130 may prompt the user to select another edge if the confidence score is below a threshold. The navigation module 124 may use the user-selected edge to determine a heading and/or lateral errors to modify the operation of the vehicle 110.

As the vehicle 110 performs a farming operation, additional images may be captured by the camera 114. The row edge detection module 130 may iteratively identify candidate edges as the additional images are captured. The edges may be iteratively selected from among the sets of candidate edges. Iterative identification of candidate edges may comprise identifying, for images captured during the farming operation and in chronological order of the images, a best fit edge within each image and determining a confidence score associated with the best fit edge. In response to a higher confidence score associated with a subsequently identified best fit edge, the navigation module 124 may determine navigational errors (e.g., heading and/or lateral errors) to be used to modify the operation (e.g., automated steering) of the vehicle 110 using the subsequently identified best fit edge.

The remote server 140 may store and execute the row vision system 120 for remote use by the vehicle 110. For example, the remote server 140 may train machine learning models using the model training engine for access over the network 160. The remote server 140 may train and provide the models to be stored and used by the vehicle 110. The remote server 140 may identify the set of candidate edges and apply an edge selection model as an alternative to the vehicle 110 or a mobile device coupled to the vehicle 110 performing the operations.

The database 150 is a storage for data collected by the vehicle 110 (e.g., using the camera 114) or provided by an operator. Data collected by the vehicle 110 may include images or videos of the environment through which the vehicle 110 travels. For example, images depicting one or more surfaces and/or edges that are captured by the camera 114 may be stored in the database 150. Data provided by the operator may include training images or training videos for the model training engine 122 to access and train machine learning models of the row vision system 120. The training data may be labeled by the operator when provided to the database 150 or the training data may be labeled by the model training engine 122 using computer vision. Data provided by the operator may include user input and/or feedback provided during the operation of the vehicle 110. For example, the operator may provide user input selecting a location on an image corresponding to a target edge between surfaces that the operator wants the vehicle 110 to track. This input and the corresponding image may be stored at the database 150. In another example, the operator may provide feedback regarding the accuracy of the edge detection, which may be stored at the database 150 to retrain a machine learning model and/or adjust algorithms used by the row vision system 120 to detect edges, detect hoods, determine steering wheel direction, determine steering wheel speed, etc.

The network 160 may serve to communicatively couple the vehicle 110, the remote server 140, and the database 150. In some embodiments, the network 160 includes any combination of local area and/or wide area networks, using wired and/or wireless communication systems. The network 160 may use standard communications technologies and/or protocols. For example, the network 160 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 160 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML), extensible markup language (XML), JavaScript Object Notation (JSON), or Protocol Buffers (Protobuf). In some embodiments, all or some of the communication links of the network 160 may be encrypted using any suitable technique or techniques.

Figure 2:
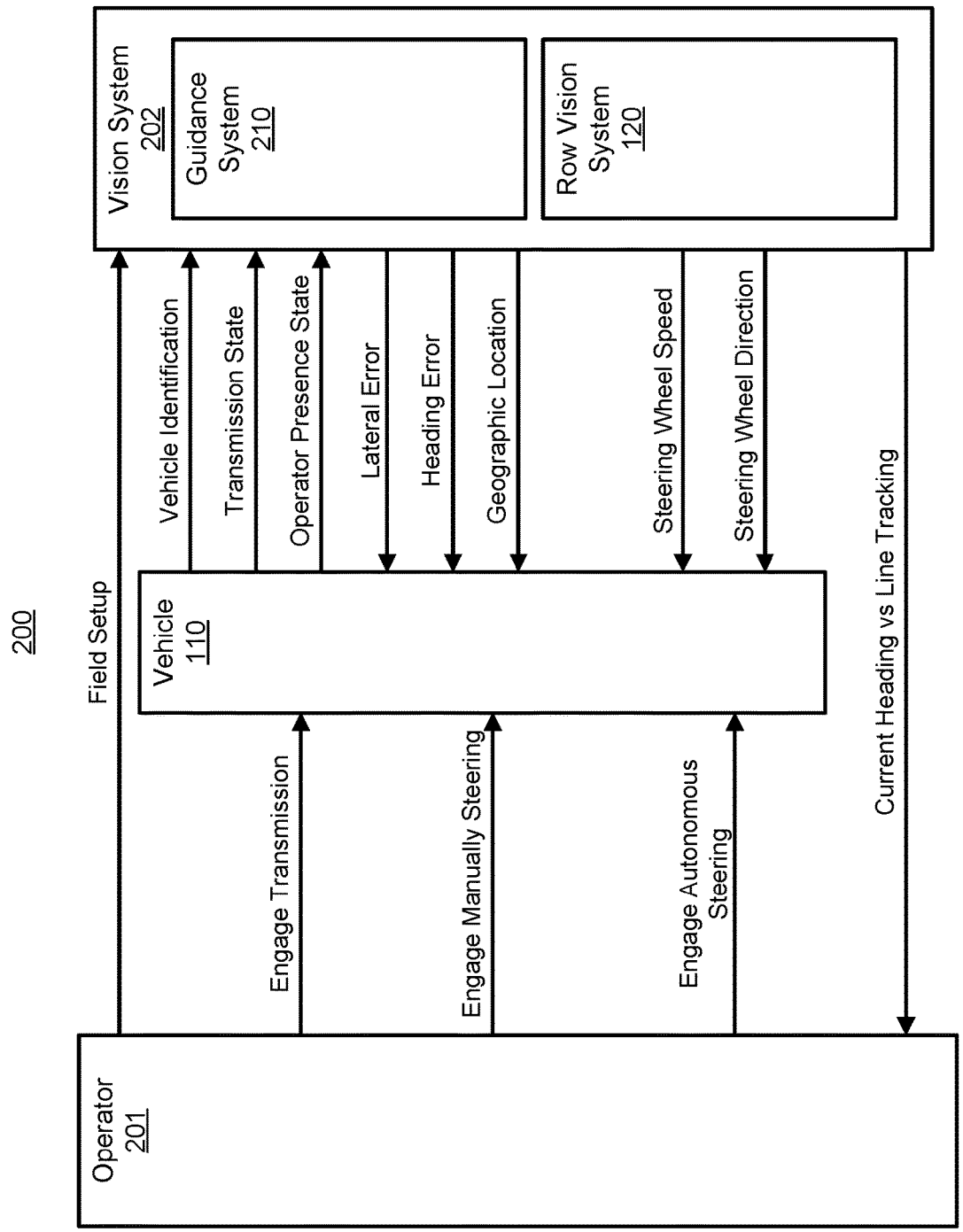
FIG. 2 is a block diagram of logical architecture for the edge detection for the vehicle of FIG. 1, in accordance with at least one embodiment.

FIG. 2 is a block diagram of a logical architecture 200 for the edge detection for the vehicle 110 of FIG. 1, in accordance with at least one embodiment. The logical architecture 200 depicts interactions and information communicated between an operator 201, the vehicle 110, and the vision system 202. The operator 201 may be collocated with the vehicle 110 (e.g., seated in the vehicle) or remotely located from the vehicle 110. In one example of remote location, the operator 201 may be seated in a control room using a processing device that is communicatively coupled to the vehicle 110. The vision system 202 may be software executed by a processing device integrated with the vehicle 110 or remotely located from the vehicle 110. The vision system 202 includes a guidance system 210 and the row vision system 120.

The guidance system 210 may enable the vehicle 110 to follow a route specified by the operator 201 for automated travel through a field, where the route may be independent of a desired row edge to which the operator 201 desires the vehicle 110 to follow. The guidance system 210 may determine steering instructions for automated steering using location information (e.g., GPS coordinates) and a user-specified route. The guidance system 210 may provide the determined steering instructions to the steering motor controller 113 of the vehicle 110 to modify the operations of the vehicle 110.

The guidance system 210, as depicted in FIG. 2, may be separate from the row vision system 120 and provide data such as lateral error, heading error, or geographic location (e.g., position or heading) to the row vision system 120. In some embodiments, the functionality of the guidance system 210 is incorporated into the row vision system 120. For example, the row vision system 120 may perform the lateral and heading error calculations. The guidance system 210 may receive user-specified route guidance instructions and determine lateral and/or heading error relative to a desired heading or desired guidance line derived from or defined by the route guidance instructions. This lateral and heading error determined by the guidance system with respect to the route guidance instructions may be distinct from a lateral and heading error determined for a desired row edge and navigation instructions for automated steering.

The operator 201 may provide field setup to the vision system 202. The field setup may include a map of the environment in which the vehicle 110 is planned to operate. For example, the map may include the farming field, roads around the field, the location of crops within the field, any suitable feature for representing an area of land, or a combination thereof. The field setup may include information about the environment such as the types of crops, the weather of the environment, time of day, humidity, etc. The operator may interact with the vehicle 110 by engaging the transmission, the manually steering, or automated steering of the vehicle 110.

The vehicle 110 may provide information to the vision system 202 such as the vehicle identification information, transmission state, or operator presence state. As referred to here, an operation performed by the vision system 202 may be performed by one or more of the guidance system 210 or the row vision system 120. The vehicle identification information may be used modify the automated steering as determined by the vision system 202, customizing the automated steering to the vehicle. For example, a first vehicle's steering motor may react more sensitively than a second vehicle's steering motor responsive to the same steering instructions. In another example, a first vehicle may be used for baling and a second vehicle may be used for spraying. The second vehicle may not need to track a row edge as precisely as the first vehicle to accomplish its farming operation. The vision system 202 may factor in the vehicle identification when determining navigation instructions for modifying the operation of the steering motor to account for the vehicle's particular hardware behavior or operation purpose.

The vision system 202 may use the transmission state of the vehicle to determine whether to engage in automated steering or modify navigation instructions based on the transmission state. For example, if the transmission state indicates the vehicle is stationary, the systems may not engage in automated steering or edge detection. In another example, the navigation instructions related to steering speed determined by the vision system 202 may varying depending on a gear or belt of the corresponding transmission state. The vision system 202 may use the operator presence state to determine whether to engage in automated steering. For example, if the operator presence state indicates no operator is present (e.g., the vehicle 110 has not been manually operated for more than a threshold amount of time), the vision system 202 may automatically engage in automated steering (e.g., until manually overridden by an operator).

The vision system 202 may provide the vehicle 110 with instructions or data to modify the operation of the vehicle (e.g., modify the steering motor operations). The instructions may include a steering wheel speed or a steering wheel direction. The data may include a lateral error, heading error, or geographic location. The vehicle 110 (e.g., the controller 111) may receive the instructions or data and generate corresponding instructions (e.g., processed by the steering motor controller 113) to modify the automated steering of the vehicle 110. The vision system 202 may provide one or more of a current heading or a guidance line for display to the operator 201. For example, the vision system 202 may provide both the current heading and the desired guidance line of the vehicle 110 for display at the display 112. Although FIG. 2 depicts the heading and line tracking information as being transmitted to the operator 201, the vision system 202 may transmit the information to the vehicle 110 to be displayed for the operator 201.

Edge Detection Onboard a Vehicle

Figure 3:
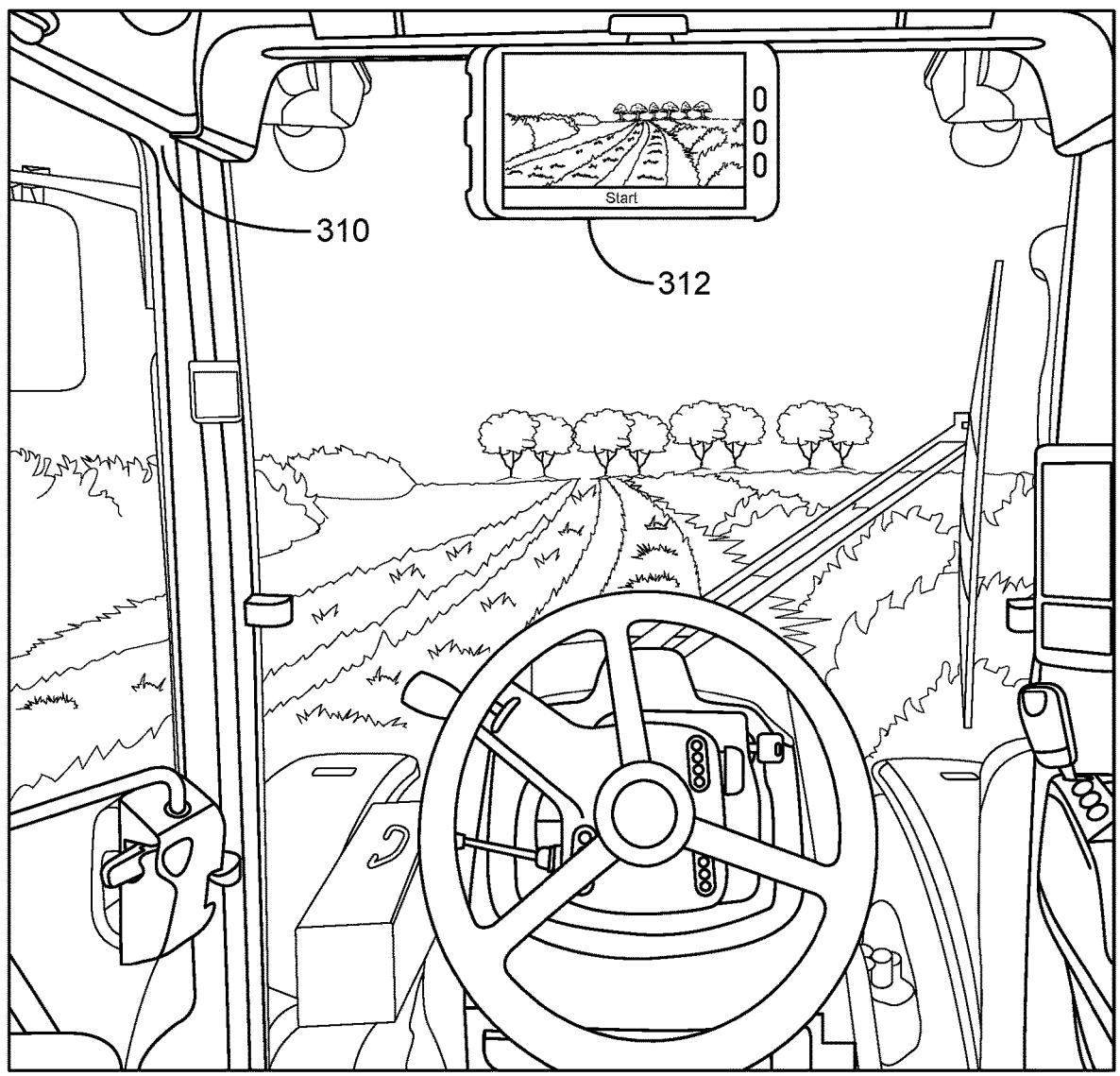
FIG. 3 depicts a front-facing view from within a vehicle using edge detection, in accordance with at least one embodiment.

FIG. 3 depicts a front-facing view 300 from within a vehicle 310 using edge detection, in accordance with at least one embodiment. The view 300 may be from the perspective of an operator seated within the vehicle 310. The view 300 may have alternative configurations than shown in FIG. 3, including for example different, fewer, or additional components within the vehicle 310.

The operator may engage with the row vision system 120 to modify the operation of the vehicle 310. For example, the operator may interact with the user interface provided via the display 312, which may be a standalone display that is communicatively coupled to the row vision system 120 (e.g., remotely located at the remote server 140 or located at a separate processing device within the vehicle 310) or a display of a processing device executing the row vision system 120.

The vehicle 310 may detect the presence status of the operator (e.g., through interactions with the display 312 or the lack thereof) and engage or disengage with automated steering based on the operator presence status. The display 312 may provide images or videos of the environment around (e.g., in front of) the vehicle 310 to the operator. The operator may interact with the display 312 by selecting a location on an image. The selected location may be used to perform edge detection and steer the vehicle 310 to track the detected edge. The GUI provided by the row vision system 120 on the display 312 is further described in the descriptions of FIGS. 4 and 5.

FIG. 4 depicts a graphical user interface (GUI) 400 for edge detection, in accordance with at least one embodiment. The GUI 400 may be displayed on a display collocated with a vehicle performing farming operations with edge detection or on a display remotely located from the vehicle. A row vision system may provide the GUI 400 for display. For example, the row vision system 120 provides the GUI 400 for display at the display 112 using the user interface module 123. The GUI 400 includes a camera frame view 401, a field type selection menu 402, calculated lateral error 403, a vehicle operation control button 404, a tractor heading indicator 405, an operator-selected tracking target 406, a bounding box 407, a detected row edge 408, a target indicator 409, and a desired guidance line 411. The camera frame view 401 depicts a vehicle 410, the hood 415 of the vehicle 410, and surface types 420 and 421. The GUI 400 may have alternative configurations than shown in FIG. 4, including for example different, fewer, or additional user interface elements.

An operator may interact with the GUI 400 to request that the row vision system 120 detect an edge between two surfaces in the environment of the vehicle 410. For example, the operator may select a location in the camera frame view 401 using a tap, click, voice command, or any suitable user input mechanism for selecting a location on the camera frame view 401. The user interface module 123 may receive the user-selected location within the image or video corresponding to the camera frame view 401. The row edge detection module 130 may additionally receive the image displayed in the camera frame view 401. Using the user-selected location, the row vision system 120 may determine an image portion of the received image, where the image portion is centered at the user-selected location and is bounded by the bounding box 407. The dimensions of the bounding box 407 may be user-specified or dynamically determined by the row vision system 120. In some embodiments, the row edge detection module 130 may determine different dimensions of the bounding box. For example, the row edge detection module 130 determines, based on user feedback, the success rate of detecting a target edge or best fit edge has decreased over time and increases the dimension of the bounding box to increase the likelihood of detecting the target edge. The bounding box 407 may be referred to herein as a "tracking region."

The row edge detection module 130 may determine the best fit edge depicted within the received image. For example, the row edge detection module 130 may perform a Hough transform to identify candidate edges within the bounding box 407 corresponding to the user-selected location, identify the surface types 420 and 421 within the bounding box 407, and select a corresponding edge detection model configured to identify a best fit edge between the identified surfaces. The best fit edge may be presented as the detected row edge 408 on the GUI 400. The detected row edge 408 may indicate the edge used to modify the automated steering of the vehicle 410. The navigation module 124 may determine the calculated lateral error 403 using the detected row edge 408. The lateral error 403 may indicate a relative distance between the operator-selected tracking target 406 and the detected row edge 408. The navigation module 124 may determine a calculated heading error using the tractor heading, as shown on the GUI 400 by the indicator 409, and a desired guidance line 411 for the automated steering of the vehicle 410.

In some embodiments, the operator may provide a user input specifying a surface on which the vehicle 410 is traveling using the field type selection menu 402. For example, the operator provides user input that the vehicle 410 is traveling on a surface of "roadside." The row edge detection module 130 may use this user input to determine a confidence score for the surfaces identified by the surface detection model 131. In some embodiments, the row vision system 120 uses the hood detection module 125 to detect the hood 415 depicted within the camera frame view 401 to detect an edge between surfaces, calculate the tractor heading as shown by the indicator 405, or determine confidence scores related to the detected edge. For example, if the hood is not detected within the camera frame view 401, the row vision system 120 may determine that the camera of the vehicle 410 is likely dislodged from a calibrated position and subsequent calculations of lateral or heading error may be inaccurate. The row vision system 120 may pause edge detection until the hood 415 is detected within the camera frame view 401. In some embodiments, the user interface module 123 may provide a notification via the GUI 400 that the hood is not detected within the camera frame view 401 and prompt the operator to check the configuration of the camera.

The operator may control the operation of the vehicle 410 using the vehicle operation control button 404. For example, the operator may select the button 404 to stop the operation of the vehicle 410 and prevent the vehicle 410 from traveling further. The button 404 may also be used to resume operation.

FIG. 5 depicts edge candidates provided within a GUI for edge detection, in accordance with at least one embodiment. Like the GUI 400, the GUI 500 may be displayed on a display collocated with a vehicle performing farming operations with edge detection or on a display remotely located from the vehicle. A row vision system may provide the GUI 500 for display. For example, the row vision system 120 provides the GUI 500 for display at the display 112 using the user interface module 123. The GUI 500 includes a camera frame view 501, an operator-selected tracking target 506, a bounding box 507, a detected row edge 508, and edge candidate groups 530 and 531. The GUI 500 may have alternative configurations than shown in FIG. 5, including for example different, fewer, or additional user interface elements.

Similar to the operator interactions with the GUI 400, the operator may select a location within the camera frame view 501 at or near which the operator identifies an edge that the vehicle should track to perform a farming operation. The selected location may be the operator-selected tracking target 506. The user interface module 123 provides the bounding box 507 in response to the operator's selection of the target 506. The row vision system 120 detects edge candidate groups 530 and 531 within the bounding box 507. For example, the row edge detection module 130 may use a Hough transform on the image portion defined by the bounding box. The result of the Hough transform may be several candidate edges, including the edges groups 530 and 531. In some embodiments, for each of the candidate edges, the row edge detection module 130 may apply the image portion with a respective candidate edge to an edge detection model to determine a confidence score corresponding to the likelihood that the respective candidate edge is the best fit edge.

In some embodiments, the row edge detection module 130 may filter and eliminate candidate edges from consideration as the best fit edge before applying an edge detection model. For example, the row edge detection module 130 may determine that group 530 is closer to the operator-selected tracking target 506 than the group 531 and eliminate the candidate edges in the group 531 from consideration. After processing one or more of the candidate edges, the row edge detection module 130 may determine that the detected row edge 508 is the best fit edge (e.g., the module 130 calculates the highest confidence score for the detected row edge 508).

The candidate edges in the edge candidate groups 530 and 531 may be selectable by the operator. For example, the user interface module 123 may provide the candidate edges as determined by the row edge detection module 130 for display at the GUI 500, prompt the user to select the target edge, and receive a user selection of one of the displayed edges. Although the GUI 500 depicts the candidate edges as being presented to an operator, the row vision system 120 may not provide the candidate edges for display in some embodiments. For example, after receiving the user input of the operator-selected tracking target 506, the row vision system 120 may proceed to determine candidate edges and determine that the detected row edge 508 is the best fit edge without presenting the determined candidate edges in the GUI 500.

Calibration for Edge Detection

Figure 6A:
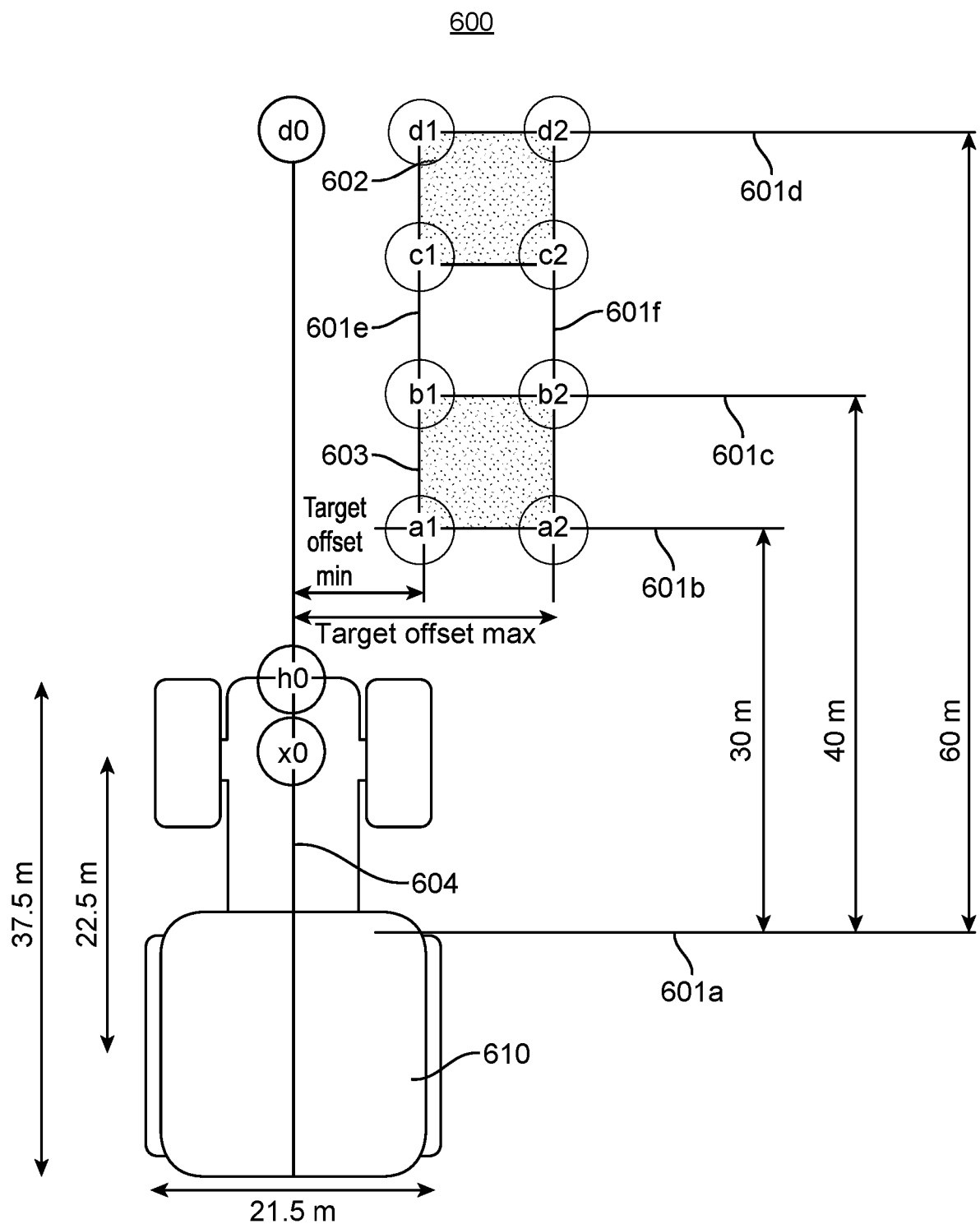
FIG. 6A shows a top view of a configuration for calibration of a camera for edge detection on a vehicle, in accordance with at least one embodiment.
Figure 6B:
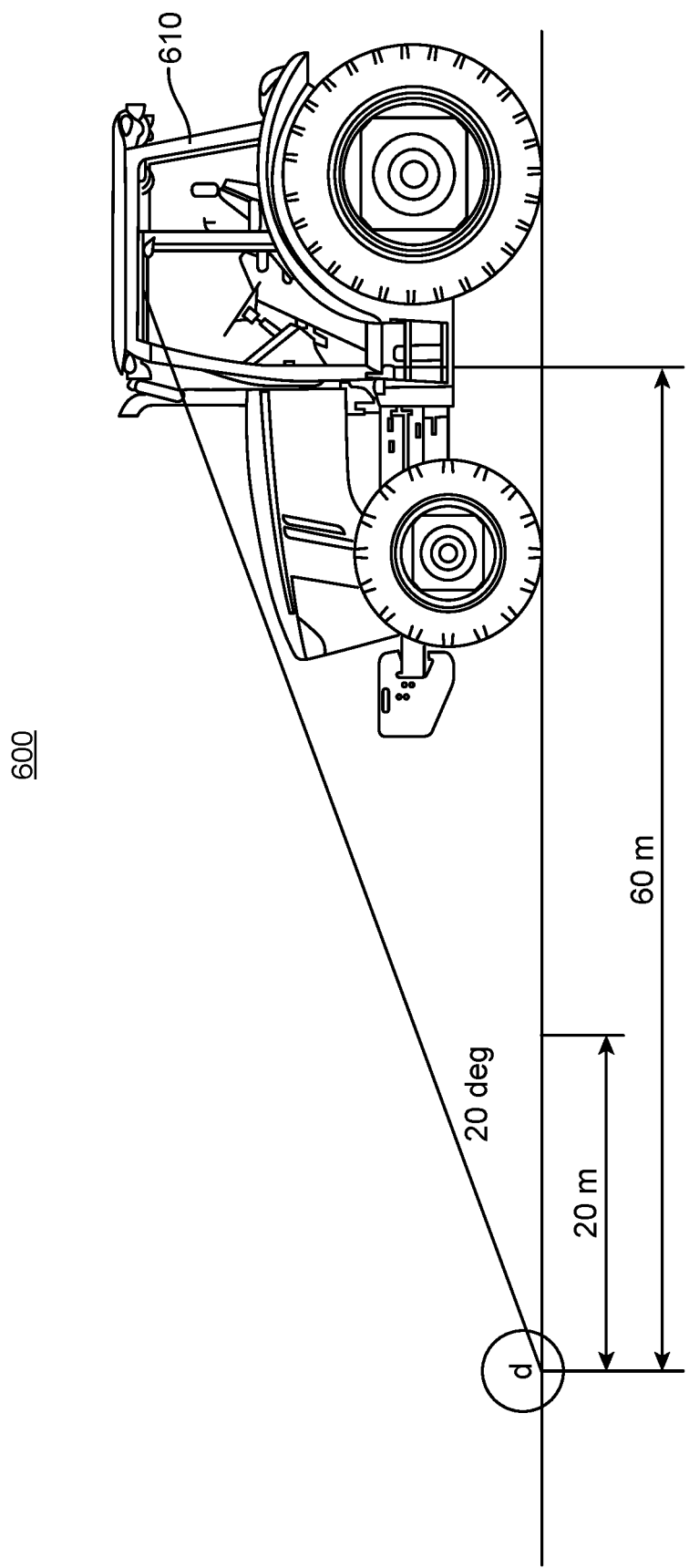
FIG. 6B shows a side view of the configuration for calibration of FIG. 6A, in accordance with at least one embodiment.
Figure 7:
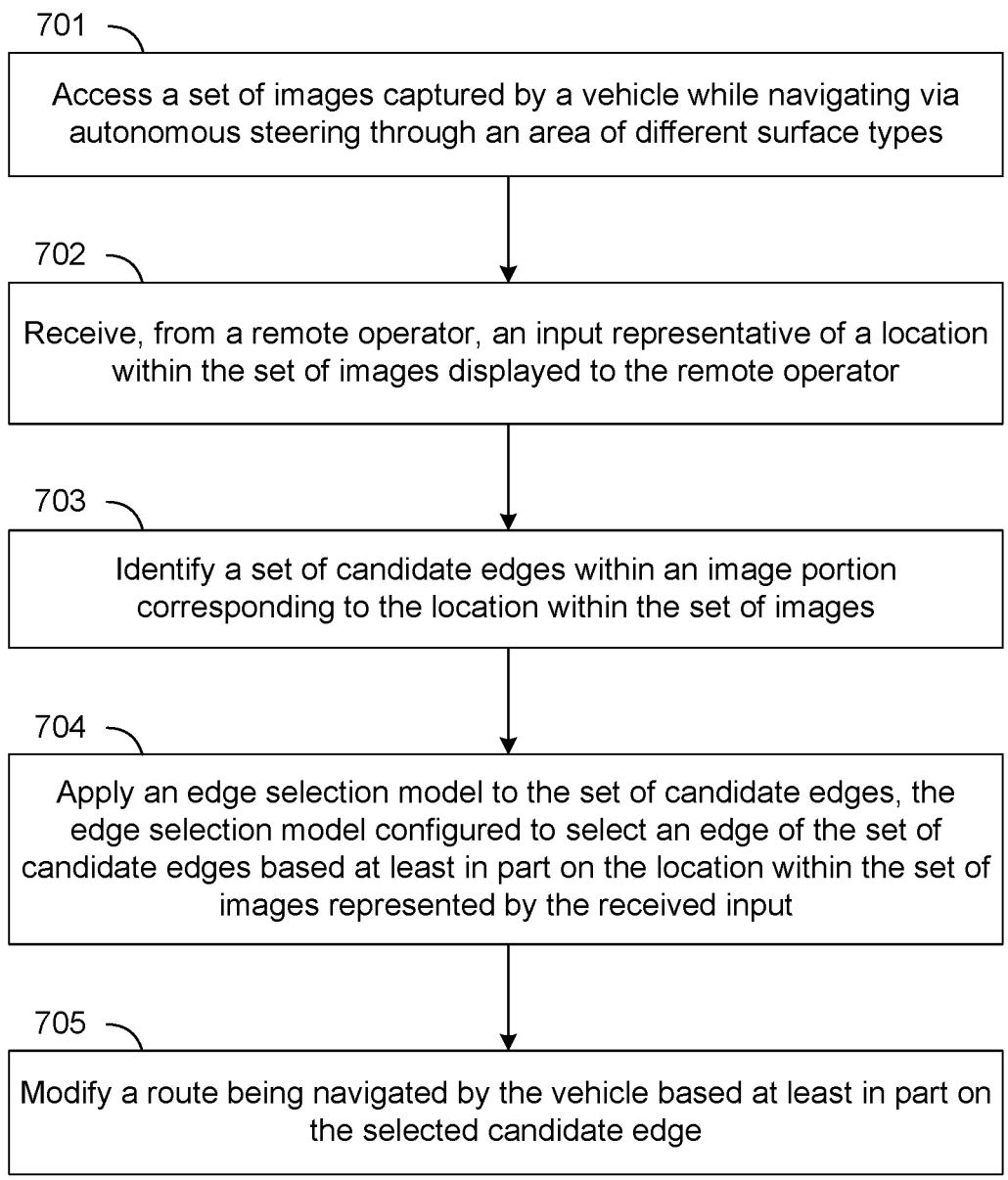
FIG. 7 is a flowchart illustrating a process for modifying, based on edge detection, the operations of a vehicle, in accordance with at least one embodiment.

FIGS. 6A and 6B show top and side views, respectively, of a configuration 600 for calibration of a camera for edge detection on a vehicle 610, in accordance with at least one embodiment. The configuration 600 includes calibration markers 601a-f, 602, 603, and 604. The calibration markers 601a-f may include lines located at predetermined distances apart from one another. The calibration markers 601a-f may be arranged to calibrate a desired camera pitch, desired camera lateral offset, hood detection, or a combination thereof. For example, the desired camera pitch may be a 20 degree angle formed between the ground and camera as shown in FIG. 6B. In another example, the desired camera lateral offset may be a distance from a vertical line through the center of the vehicle 610 that allows for a target offset ranging between one edge of a calibration mat to an opposing edge of the calibration mat.

Target offset min and max may be selected based on a type of operation that the vehicle is performing and a typical bounding box location for the type of operation. For example, if the vehicle is pulling implements with narrow working widths, the target offset min and max may be small (e.g., two to five feet). In another example, if the vehicle is pulling wide tillage implements, calibration may be done with target offset min and max that are larger (e.g., fifteen to seventeen feet). A large target offset min and max may be used to calibrate a vehicle equipped with a camera having a large field of view (e.g., greater than 130 degrees) or a unique camera 3D pose. The calibration may be used to adjust camera 3D pose to prevent occlusion issues that may exist with attachments to the vehicle (e.g., loaders, tanks, or toolboxes).

As shown in FIG. 6A, the calibration markers 601b-d may be located at 30, 40, and 60 meters vertically away from the calibration marker 601a. The calibration marker 601a may be aligned with a line at the vehicle 610 that includes the location of the camera at (e.g., within) the vehicle 610. The calibration markers 601a-d oriented horizontally may be a different color than the calibration markers 601e-f. The color distinguishing may be used to distinguish the different orientations during image processing of images or videos capturing the configuration 600 during calibration. The calibration markers 602 and 603 may be associated with a calibration mat. For example, the calibration mat may be located between the calibration markers 602 and 603 and between the calibration markers 601e and 601f.

Hood detection may be included within the calibration process in addition to or alternatively to the calibration of the camera lateral offset or pitch. The hood of the vehicle 610 may include a calibration marker 604 such as a painted line along the length (i.e., vertically oriented over the hood of the vehicle 610 in FIG. 6A). The calibration marker 604 may be a color and dimension to facilitate image processing to identify the calibration marker 604 and hence, the hood within images or videos. For example, the calibration marker 604 may be a yellow line against green paint of the vehicle 610. In another example, the calibration marker 604 may be half an inch thick. The detected hood may be used for self-diagnostics while the vehicle 610 is in operation (e.g., performing farming operations). The self-diagnostics may be periodically performed to determine whether the row vision system 120 is detecting the environment correctly. For example, self-diagnostics determine that the camera is detecting the environment correctly based at least on the camera pitch being approximately 20 degrees and thus, able to capture the hood in images.

The configuration 600 shown in FIGS. 6A and 6B may be dependent upon the location of the camera within the vehicle 610 or the dimensions of the vehicle 610. The configuration 600 may be modified accordingly. For example, the vertical distance between the camera to the calibration mat 602 may be 30 meters rather than 60 meters away from the camera, depending on the height at which the camera is located at the vehicle 610, to maintain a 20 degree camera pitch as shown in FIG. 6B. In some embodiments, there may be additional or fewer calibration markers than shown in the configuration 600. For example, the calibration may have at least the calibration markers 602 and 602. Minimizing the number of calibration markers may reduce processing or power resources needed to calibrate the camera or calibrate for hood detection.

Process for Detecting Edges Using the Row Vision System

FIG. 7 is a flowchart illustrating a process 700 for modifying, based on edge detection, the operations of a vehicle, in accordance with at least one embodiment. In some embodiments, the row vision system 120 performs operations of the process 700 in parallel or in different orders, or may perform different steps. For example, the process 700 may include calibrating the camera lateral offset using a configuration as described in the description of FIGS. 6A and 6B. In another example, the process 700 may include training a machine learning model to be used in identifying a best fit edge of candidate edges.

In one example, the process 700 may involve a vehicle (e.g., a tractor) performing a farming operation (e.g., mowing). The tractor may be autonomously steered through a farm (e.g., using the row vision system 120), tracking an edge of a crop surface for mowing. The autonomous steering may track one or more of a predetermined route through the farm or an edge between surfaces (e.g., between soil and the crop). An operator may be located within the tractor, interacting with a user input for the row vision system 120 to specify the target edge of the crop surface to which the tractor is to track. Alternatively or additionally, an operator may be located remotely and may use a network (e.g., the network 160) to control the tractor. For example, the remote operator may transmit instructions (e.g., a target edge to track) to a row vision system 120 located onboard the vehicle or operate a remotely located row vision system 120 that transmits instructions to a controller onboard the vehicle to modify the autonomous steering.

The row vision system 120 accesses 701 a set of images captured by a vehicle while navigating via autonomous steering through an area of different surface types. For example, the row vision system 120 located remotely from the tractor of the previous example accesses 701 images of the farm that depict soil and crop ahead of the tractor during the mowing operation. The tractor autonomously steers through the farm that includes the different surface types such as soil and a crop type (e.g., grass). The images may be captured by a camera integrated with the tractor or integrated with an operator device (e.g., a tablet) that may be installed and removed from the tractor once the farming operation is completed. The camera positioning (e.g., offset or pitch) may be calibrated by the row vision system 120 before the mowing begins via the calibration configuration described in FIGS. 6A and 6B. In one example in which the operator is located remotely from the tractor, the row vision system 120 may be located onboard the tractor. The row vision system 120 may transmit the images to the remote operator (e.g., to a tablet communicatively coupled to the tractor using the network 160). In another example in which the operator is located remotely from the tractor, the row vision system 120 is also located remotely from the tractor (e.g., executed on the remote server 140). The images may be transmitted by the tractor to the remote server 140. The images may be displayed to an operator (e.g., at the tablet) by the row vision system 120 for the operator to provide user input selecting an edge that the tractor should track.

The row vision system 120 receives 702, from a remote operator, an input representative of a location within the set of images displayed to the remote operator. The remote operator may provide an input (i.e., user input) selecting the edge that the tractor should track. The selection may be a tap of a display (e.g., the display 112) that presents the accessed 701 images. The selection may correspond to one or more pixels of an image, where the one or more pixels depict an operator selected tracking target, such as the operator-selected tracking target 406 shown in FIG. 4. In some embodiments, the location may correspond to a first pixel of a first image and to a second pixel of a second, subsequent image. That is, the location of the user-selected target may change across the images accessed 701 yet correspond to the same target in the environment (i.e., the edge between surface types).

The row vision system 120 identifies 703 a set of candidate edges within an image portion corresponding to the location within the set of images. The row vision system 120 may use the input received 702 to determine a bounding box centered at the location within the set of images. The row vision system 120 performs an operation such as a Hough transform to detect one or more candidate edges within the bounding box. The row vision system 120 may detect several candidate edges between the soil and crop surfaces that the tractor may follow to perform the mowing operation.

The row vision system 120 applies 704 an edge selection model to the set of candidate edges, the edge selection model configured to select an edge of the set of candidate edges based at least in part on the location within the set of images represented by the received input. The edge selection model may include one or more machine learning models. For example, the application 704 of the edge selection model may involve an application of the surface detection model 131 followed by one of the edge detection models 132 or 133. The row vision system 120 uses the edge selection model to select an edge (e.g., a best fit edge) of the identified 703 set of candidate edges within the bounding box centered on the operator-selected location within the set of images. The edge selection model may first identify the two surfaces within the bounding box are soil and crop. The edge selection model or the surface detection model 131 may be configured to determine that the crop surface is of crop type "grass." Based on the identified surfaces, the edge selection model may use a corresponding edge detection model trained on images of edges between soil and crop (e.g., grass) to determine a best fit edge within the bounding box. The edge selection model may assign confidence scores to one or more of the candidate edges, where the best fit edge is selected based on the confidence score (e.g., the edge having the highest confidence score).

The row vision system 120 modifies 705 a route being navigated by the vehicle based at least in part on the selected candidate edge. In some embodiments, the row vision system 120 determines one or more of a heading or lateral error of the vehicle to modify 705 the route being navigated. For example, the row vision system 120 uses the location of the selected candidate edge (e.g., the best fit edge) within the accessed 701 images and one or more of a guidance line or heading of the vehicle to determine the lateral or heading error, respectively. The determined error may be used to determine a modification to the steering direction or speed of the autonomous steering used to control the vehicle. In some embodiments, the lateral offset indicates the relative distance between the operator-selected target and best fit edge line. For example, the row vision system 120 determines, for the tractor performing mowing, a lateral offset between the operator-selected target and the best fit edge between soil and crop. Using the determined lateral offset, the row vision system 120 modifies 705 the route navigated by the tractor. Modification 705 of the route navigated by the vehicle may include modifying a direction in which the vehicle is traveling, a speed at which the vehicle travels in that direction, or a combination thereof. For example, the row vision system 120 modifies 705 the steering direction of the tractor in response to determining that the lateral offset between the operator-selected target and the best fit edge indicates that the tractor is traveling away from the crop.

ADDITIONAL CONSIDERATIONS

Some portions of the preceding detailed descriptions have been presented in terms of algorithms and symbolic representations of operations on data bits within a computer memory. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. The software modules described herein may be embodied as program code (e.g., software comprised of instructions stored on non-transitory computer readable storage medium and executable by at least one processor) and/or hardware (e.g., application specific integrated circuit (ASIC) chips or field programmable gate arrays (FPGA) with firmware). The modules correspond to at least having the functionality described herein when executed/operated.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

A processing device as described herein may include one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. The processing device may be configured to execute instructions for performing the operations and steps described herein. A controller or microcontroller as described herein may include one or more processors, such as a central processing unit, internal memory, and input/output components. The controller may communicatively couple processing devices such that one processing device may manage the operation of another processing device through the controller. In one example, a controller may be a JOHN DEERE AUT300. A controller may be communicatively coupled to a processing device through a CAN bus.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. In addition, use of the "a" or "an" are employed to describe elements and components of the embodiments herein. This description should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for automated quality check and diagnosis for production model refresh through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
accessing a set of images captured by a vehicle while navigating via autonomous steering through an area of different surface types, the set of images comprising images of a ground surface in front the vehicle;
receiving, from a remote operator, an input representative of a location within the set of images displayed to the remote operator;
identifying a set of candidate edges within an image portion corresponding to the location within the set of images, each candidate edge corresponding to a candidate boundary between two different surface types;
determining, for each of the set of candidate edges, a distance between the candidate edge and the location within the set of images represented by the input received from the remote operator;
applying an edge selection model to the set of candidate edges, the edge selection model configured to select an edge of the set of candidate edges based at least in part on the determined distance for each candidate edge; and
modifying a route being navigated by the vehicle based at least in part on the selected candidate edge.

2. The method of claim 1, wherein the image portion within the set of images comprises a bounding box centered on the location represented by the received input.

3. The method of claim 1, wherein the set of candidate edges are identified using an edge detection model corresponding to one or both of the two different surface types.

4. The method of claim 3, wherein the two different surface types comprise soil and one of a crop, grass, and pavement, and wherein the edge detection model comprises a machine-learned model that is trained on images of manually tagged boundaries between soil and the one of a crop, grass, and pavement.

5. The method of claim 1, wherein the edge selection model is configured to weight the candidate edges at least in part based on the distance between each candidate edge and the location represented by the received input within the set of images, wherein a first candidate edge is weighted lower than a second candidate edge that is closer to the location represented by the received input than the first candidate edge.

6. The method of claim 1, wherein the edge selection model comprises a machine-learned model that is trained on images each with a set of candidate edges and a manually-selected edge of the set of candidate edges.

7. The method of claim 1, further comprising:
identifying, by the vehicle, each of the two different surface types; and
selecting, by the vehicle, the edge selection model from a set of edge selection models based on the identified surface types.

8. The method of claim 7, wherein an identified surface comprises a type of crop, and wherein the selected edge selection model is trained based on images of the type of crop.

9. The method of claim 1, wherein the set of candidate edges are identified by and the edge selection model is applied by the vehicle.

10. The method of claim 1, wherein the set of candidate edges are identified by and the edge selection model is applied by a remote computing system communicatively coupled to the vehicle.

11. The method of claim 1, wherein modifying the route being navigated by the vehicle comprises moving the vehicle such that an edge of a tool or instrument being pulled by the vehicle is aligned with the selected edge.

12. The method of claim 1, wherein additional sets of candidate edges are iteratively identified as the vehicle captures additional images, and wherein edges are iteratively selected from among the sets of candidate edges.

13. A system comprising a hardware processor and a non-transitory computer-readable storage medium storing executable instructions that, when executed by the processor, are configured to cause the system to perform steps comprising:
accessing a set of images captured by a vehicle while navigating via autonomous steering through an area of different surface types, the set of images comprising images of a ground surface in front the vehicle;
receiving, from a remote operator, an input representative of a location within the set of images displayed to the remote operator;
identifying a set of candidate edges within an image portion corresponding to the location within the set of images, each candidate edge corresponding to a candidate boundary between two different surface types;
determining, for each of the set of candidate edges, a distance between the candidate edge and the location within the set of images represented by the input received from the remote operator;
applying an edge selection model to the set of candidate edges, the edge selection model configured to select an edge of the set of candidate edges based at least in part on the determined distance for each candidate edge; and
modifying a route being navigated by the vehicle based at least in part on the selected candidate edge.

14. The system of claim 13, wherein the image portion within the set of images comprises a bounding box centered on the location represented by the received input.

15. The system of claim 13, wherein the set of candidate edges are identified using an edge selection model corresponding to one or both of the two different surface types, wherein the two different surface types comprise soil and one of a crop, grass, and pavement, and wherein the edge selection model comprises a machine-learned model that is trained on images of manually tagged boundaries between soil and the one of a crop, grass, and pavement.

16. The system of claim 13, wherein the edge selection model is configured to weight the candidate edges at least in part based on the distance between each candidate edge and the location represented by the received input within the set of images, wherein a first candidate edge is weighted lower than a second candidate edge that is closer to the location represented by the received input than the first candidate edge.

17. The system of claim 13, wherein the edge selection model comprises a machine-learned model that is trained on images each with a set of candidate edges and a manually-selected edge of the set of candidate edges, and wherein the edge selection model is selected among a set of edge selection models based on an identified surface type of the two different surface types.

18. The system of claim 13, wherein the hardware processor and the non-transitory computer-readable storage medium are implemented within one of the vehicle and a remote computing system coupled to the vehicle.

19. The system of claim 13, wherein modifying the route being navigated by the vehicle comprises moving the vehicle such that an edge of a tool or instrument being pulled by the vehicle is aligned with the selected edge.

20. The system of claim 13, wherein additional sets of candidate edges are iteratively identified as the vehicle captures additional images, and wherein edges are iteratively selected from among the sets of candidate edges.

21. A method comprising:
accessing a set of images captured by a vehicle while navigating via autonomous steering through an area of different surface types, the set of images comprising images of a ground surface in front the vehicle;
identifying a set of candidate edges within the set of images, each candidate edge corresponding to a candidate boundary between two different surface types;
displaying, to a remote operator via a device of the remote operator, the set of images overlayed with the identified set of candidate edges;
receiving, from the remote operator, a selection of a candidate edge from the set of candidate edges displayed to the remote operator to be overlayed on the set of images; and
modifying a route being navigated by the vehicle based at least in part on the selected candidate edge.

* * * * *